US009525610B2

(12) United States Patent
Radulescu et al.

(10) Patent No.: US 9,525,610 B2
(45) Date of Patent: Dec. 20, 2016

(54) BACKHAUL MANAGEMENT OF A SMALL CELL USING A LIGHT ACTIVE ESTIMATION MECHANISM

(71) Applicant: QUALCOMM Incorporated, San Diego, CA (US)

(72) Inventors: Andrei Dragos Radulescu, San Diego, CA (US); Farhad Meshkati, San Diego, CA (US); Rajat Prakash, San Diego, CA (US); Rashmin Ranjitsinh Anjaria, San Diego, CA (US); Sumeeth Nagaraja, San Diego, CA (US); Tao Chen, San Diego, CA (US); Vinod Viswanatha Menon, San Diego, CA (US); Sanjay Sridhar Kamath, San Diego, CA (US); Daehak Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 14/525,102

(22) Filed: Oct. 27, 2014

(65) Prior Publication Data

US 2015/0117207 A1 Apr. 30, 2015

Related U.S. Application Data

(60) Provisional application No. 61/897,069, filed on Oct. 29, 2013, provisional application No. 61/897,061, (Continued)

(51) Int. Cl.
*H04L 12/26* (2006.01)
*H04W 28/02* (2009.01)
(Continued)

(52) U.S. Cl.
CPC ......... *H04L 43/0852* (2013.01); *H04L 41/142* (2013.01); *H04L 43/10* (2013.01);
(Continued)

(58) Field of Classification Search
None
See application file for complete search history.

(56) References Cited

U.S. PATENT DOCUMENTS 5,530,700 A 6/1996 Tran et al.
8,160,034 B1 4/2012 Sarkar et al.
(Continued)

FOREIGN PATENT DOCUMENTS

CN 103346986 A 10/2013
EP 1367846 A1 12/2003
(Continued)

OTHER PUBLICATIONS

International Search Report and Written Opinion—PCT/US2014/062747—ISA/EPO—Feb. 18, 2015. (12 total pages).
(Continued)

*Primary Examiner* — Jeffrey M Rutkowski
*Assistant Examiner* — Mehedi Aley
(74) *Attorney, Agent, or Firm* — Arent Fox LLP

(57) ABSTRACT

A method and an apparatus for a light active estimation mechanism for backhaul management at a small cell base station are disclosed. For example, the method may include transmitting a first data packet from the small cell base station to a network entity, receiving a second data packet from the network entity in response to the transmission, calculating a time delay between the transmitting of the first data packet and the receiving of the second data packet, and determining whether or not a backhaul of the small cell base station is congested based on the calculated time delay. As such, light active estimation mechanism for backhaul management at a small cell base station may be achieved.

30 Claims, 10 Drawing Sheets

Related U.S. Application Data filed on Oct. 29, 2013, provisional application No. 61/897,064, filed on Oct. 29, 2013, provisional application No. 61/897,114, filed on Oct. 29, 2013, provisional application No. 61/897,098, filed on Oct. 29, 2013, provisional application No. 61/933,732, filed on Jan. 30, 2014.

(51) Int. Cl.

| | | |
|---|---|---|
| *H04W 28/10* | (2009.01) | |
| *H04W 36/26* | (2009.01) | |
| *H04W 72/04* | (2009.01) | |
| *H04L 29/08* | (2006.01) | |
| *H04L 29/06* | (2006.01) | |
| *H04W 88/18* | (2009.01) | |
| *H04W 28/08* | (2009.01) | |
| *H04W 36/22* | (2009.01) | |
| *H04W 36/00* | (2009.01) | |
| *H04L 12/803* | (2013.01) | |
| *H04L 12/841* | (2013.01) | |
| *H04W 24/00* | (2009.01) | |
| *H04L 12/24* | (2006.01) | |
| *H04W 88/08* | (2009.01) | |
| *H04W 84/04* | (2009.01) | |
| *H04L 12/801* | (2013.01) | |

(52) U.S. Cl.
CPC .......... *H04L 47/125* (2013.01); *H04L 47/283* (2013.01); *H04L 67/2861* (2013.01); *H04L 69/16* (2013.01); *H04W 24/00* (2013.01); *H04W 28/0226* (2013.01); *H04W 28/0247* (2013.01); *H04W 28/0273* (2013.01); *H04W 28/0284* (2013.01); *H04W 28/0289* (2013.01); *H04W 28/08* (2013.01); *H04W 28/10* (2013.01); *H04W 36/0072* (2013.01); *H04W 36/22* (2013.01); *H04W 36/26* (2013.01); *H04W 72/042* (2013.01); *H04W 72/0446* (2013.01); *H04W 88/182* (2013.01); *H04L 43/0858* (2013.01); *H04L 43/0864* (2013.01); *H04L 43/0888* (2013.01); *H04L 43/103* (2013.01); *H04L 47/14* (2013.01); *H04L 47/193* (2013.01); *H04W 84/045* (2013.01); *H04W 88/08* (2013.01)

(56) References Cited

U.S. PATENT DOCUMENTS

| | | | |
|---|---|---|---|
| 8,219,094 B2 | 7/2012 | Huber et al. | |
| 8,363,564 B1 | 1/2013 | Talley et al. | |
| 8,400,921 B2 | 3/2013 | Grayson et al. | |
| 8,538,450 B2 | 9/2013 | Zhang et al. | |
| 8,861,477 B1* | 10/2014 | Goyal | H04W 36/0083 |
| | | | 370/331 |
| 2002/0028675 A1 | 3/2002 | Schmutz et al. | |
| 2004/0001467 A1 | 1/2004 | Cromer et al. | |
| 2004/0064577 A1 | 4/2004 | Dahlin et al. | |
| 2005/0059417 A1 | 3/2005 | Zhang et al. | |
| 2006/0215574 A1 | 9/2006 | Padmanabhan et al. | |
| 2006/0291479 A1* | 12/2006 | Sasson | H04L 69/28 |
| | | | 370/395.62 |
| 2007/0177510 A1 | 8/2007 | Natarajan et al. | |
| 2009/0029645 A1 | 1/2009 | Leroudier | |
| 2009/0088157 A1 | 4/2009 | Aaron | |
| 2010/0027431 A1 | 2/2010 | Morrison et al. | |
| 2010/0157825 A1 | 6/2010 | Anderlind et al. | |
| 2010/0190509 A1 | 7/2010 | Davis | |
| 2010/0271962 A1 | 10/2010 | Han et al. | |
| 2011/0039564 A1 | 2/2011 | Johnstone et al. | |
| 2011/0111753 A1 | 5/2011 | Vainikka et al. | |
| 2011/0250891 A1 | 10/2011 | Zou et al. | |
| 2011/0319071 A1 | 12/2011 | Beppler et al. | |
| 2012/0021788 A1 | 1/2012 | Yavuz et al. | |
| 2012/0106418 A1* | 5/2012 | Xhafa | H04W 52/0216 |
| | | | 370/311 |
| 2012/0178483 A1 | 7/2012 | Rosenau | |
| 2012/0218966 A1* | 8/2012 | Yamazaki | H04W 48/16 |
| | | | 370/329 |
| 2012/0264470 A1 | 10/2012 | Bajj et al. | |
| 2012/0270553 A1 | 10/2012 | Ha | |
| 2012/0324100 A1 | 12/2012 | Tomici et al. | |
| 2012/0327779 A1 | 12/2012 | Gell et al. | |
| 2013/0021933 A1 | 1/2013 | Kovvali et al. | |
| 2013/0034043 A1 | 2/2013 | Yu et al. | |
| 2013/0053048 A1 | 2/2013 | Garcia et al. | |
| 2013/0084864 A1 | 4/2013 | Agrawal et al. | |
| 2013/0194948 A1 | 8/2013 | Mallik et al. | |
| 2013/0201959 A1 | 8/2013 | Guo et al. | |
| 2013/0225167 A1 | 8/2013 | Tokgoz et al. | |
| 2013/0225181 A1 | 8/2013 | Radulescu et al. | |
| 2013/0231118 A1 | 9/2013 | Whinnett et al. | |
| 2013/0286953 A1* | 10/2013 | Ye | H04W 56/0045 |
| | | | 370/329 |
| 2014/0003230 A1 | 1/2014 | Mathur et al. | |
| 2014/0022904 A1 | 1/2014 | Ahmad et al. | |
| 2014/0047448 A1* | 2/2014 | Bishop | G06F 9/542 |
| | | | 718/103 |
| 2014/0064083 A1 | 3/2014 | Ray et al. | |
| 2014/0066006 A1 | 3/2014 | Ray et al. | |
| 2014/0073317 A1 | 3/2014 | Zhou et al. | |
| 2014/0362688 A1* | 12/2014 | Zhang | H04W 28/0289 |
| | | | 370/230 |
| 2015/0109940 A1 | 4/2015 | Okhravi et al. | |
| 2015/0117197 A1 | 4/2015 | Radulescu et al. | |
| 2015/0117206 A1 | 4/2015 | Radulescu et al. | |
| 2015/0117208 A1 | 4/2015 | Radulescu et al. | |
| 2015/0119042 A1 | 4/2015 | Radulescu et al. | |
| 2015/0119046 A1* | 4/2015 | Radulescu | H04L 43/10 |
| | | | 455/438 |
| 2015/0207598 A1* | 7/2015 | Hua | H04L 67/2823 |
| | | | 709/226 |

FOREIGN PATENT DOCUMENTS

| | | |
|---|---|---|
| EP | 2081324 A1 | 7/2009 |
| EP | 2 282 578 A1 | 2/2011 |
| EP | 2081324 B1 | 1/2013 |
| EP | 2 785 108 A1 | 10/2014 |
| WO | WO-2009/067297 A1 | 5/2009 |
| WO | WO-2009/105687 A1 | 8/2009 |
| WO | WO-2009/146726 A1 | 12/2009 |
| WO | WO-2011/018639 A1 | 2/2011 |
| WO | WO-2012121656 A1 | 9/2012 |
| WO | WO-2012/145706 A1 | 10/2012 |
| WO | WO-2013/036906 A1 | 3/2013 |
| WO | WO-2013/040594 A1 | 3/2013 |
| WO | WO-2013/063609 A1 | 5/2013 |
| WO | WO-2013/079556 A1 | 6/2013 |
| WO | WO-2013/126848 A1 | 8/2013 |
| WO | WO-2014000128 A1 | 1/2014 |
| WO | WO-2014/043665 A2 | 3/2014 |
| WO | WO-2014/053183 A1 | 4/2014 |

OTHER PUBLICATIONS

International Search Report and Written Opinion—PCT/US2014/062742—ISA/EPO—Feb. 5, 2015. (15 total pages).
QUALCOMM: "Neighborhood Small Cells & UltraSON Open for LTE", Jul. 18, 2013 (Jul. 18, 2013), XP055162319.
QUALCOMM: "Small Cells & UltraSON™", Apr. 17, 2014 (Apr. 17, 2014), XP055161743, p. 18.
Wang Z., et al., "Eliminating Periodic Packet Losses in the 4.3-Tahoe BSD TCP Congestion Control Algorithm", ACM SIGCOMM Computer Communication Review, ACM, New York, NY, US, vol. 22, No. 2, Apr. 1, 1992 (Apr. 1, 1992), pp. 9-13, XP000271274, ISSN: 0146-4833, DOI: 10.1145/141800.141801.

(56) References Cited

OTHER PUBLICATIONS

Becvar Z., et al., "Adaptive Hysteresis Margin for Handover in Femtocell Networks," IEEE Department of Telecommunication Engineering, Sep. 2010, pp. 256-261.
International Search Report and Written Opinion—PCT/US2014/062744—ISA/EPO—Jan. 26, 2015. (15 total pages).

* cited by examiner

BACKHAUL MANAGEMENT OF A SMALL CELL USING A LIGHT ACTIVE ESTIMATION MECHANISM

CLAIM OF PRIORITY UNDER 35 U.S.C. §119

The present application for patent claims priority to U.S. Provisional Application No. 61/897,069, filed Oct. 29, 2013, entitled "Backhaul Estimation for Small Cells—Light Active Estimation," U.S. Provisional Application No. 61/897,061, filed Oct. 29, 2013, entitled "Backhaul Estimation for Small Cells—Calibration," U.S. Provisional Application No. 61/897,064, filed Oct. 29, 2013, entitled "Backhaul Aware Load Management for Small Cells—Passive Estimation," U.S. Provisional Application No. 61/897,114, filed Oct. 29, 2013, entitled "Method and Apparatus for Backhaul Congestion Estimation Using Heavy Active Probing for Small Cells," U.S. Provisional Application No. 61/897,098, filed Oct. 29, 2013, entitled "Apparatus and Method for Off-Loading User Equipment from a Small Cell," U.S. Provisional Application No. 61/933,732, filed Jan. 30, 2014, entitled "Backhaul Management of a Small Cell" all assigned to the assignee hereof and hereby expressly incorporated by reference herein.

BACKGROUND

Aspects of the present disclosure relate generally to wireless communication systems, and more particularly to backhaul estimation for small cells and the like.

Wireless communication networks are widely deployed to provide various communication services such as telephony, video, data, messaging, broadcasts, and so on. Such networks, which are usually multiple access networks, support communications for multiple users by sharing the available network resources. In cellular networks, macro base stations (or macro cells or conventional base stations) provide connectivity and coverage to a large number of users over a certain geographical area. To supplement macro base stations, restricted power or restricted coverage base stations, referred to as small coverage base stations or small cell base stations or small cells, can be deployed to provide more robust wireless coverage and capacity to mobile devices. For example, small cells can be deployed for incremental capacity growth, richer user experience, in-building or other specific geographic coverage, and/or the like.

However, the deployment of small cell base stations may also encroach on the operation of other devices that typically utilize the same space, such as Wireless Local Area Network (WLAN) devices operating in accordance with one of the IEEE 802.11x communication protocols (so-called "Wi-Fi" devices) or other wired or wireless devices sharing the same Internet connection in a user's residence or office building. The unmanaged sharing of common backhaul resources may lead to various throughput and/or data integrity problems for all devices.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for light active estimation mechanism for backhaul management at a small cell base station. For example, in an aspect, the present disclosure presents an example method that may include transmitting a first data packet from the small cell base station to a network entity, receiving a second data packet from the network entity in response to the transmission, calculating a time delay between the transmitting of the first data packet and the receiving of the second data packet, and determining whether or not a backhaul of the small cell base station is congested based on the calculated time delay.

Additionally, the present disclosure presents an example apparatus for light active estimation mechanism for backhaul management at a small cell base station that may include means for transmitting a first data packet from the small cell base station to a network entity, means for receiving a second data packet from the network entity in response to the transmission, means for calculating a time delay between the transmitting of the first data packet and the receiving of the second data packet, and means for determining whether or not a backhaul of the small cell base station is congested based on the calculated time delay.

In a further aspect, the present disclosure presents a non-transitory computer readable medium for light active estimation mechanism for backhaul management at a small cell base station comprising code that, when executed by a processor or processing system included within the small cell base station, cause the small cell base station to transmit a first data packet from the small cell base station to a network entity, receive a second data packet from the network entity in response to the transmission, calculate a time delay between the transmitting of the first data packet and the receiving of the second data packet, and determine whether or not a backhaul of the small cell base station is congested based on the calculated time delay.

Furthermore, in an aspect, the present disclosure presents an example apparatus for a light active estimation mechanism for backhaul management at a small cell base station, that may include a data packet transmitter to transmit a first data packet from the small cell base station to a network entity, a data packet receiver to receive a second data packet from the network entity in response to the transmission, a time delay calculator to calculate a time delay between the transmitting of the first data packet and the receiving of the second data packet, and a backhaul congestion determiner to determine whether or not a backhaul of the small cell base station is congested based on the calculated time delay.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure presents a method and apparatus for of light active estimation mechanism for backhaul management at a small cell base station, that includes transmitting a first data packet from the small cell base station to a network entity, receiving a second data packet from the network entity in response to the transmission, calculating a time delay between the transmitting of the first data packet and the receiving of the second data packet, and determining whether or not a backhaul of the small cell base station is congested based on the calculated time delay.

As used herein, the term "small cell" may refer to an access point or to a corresponding coverage area of the access point, where the access point in this case has a relatively low transmit power or relatively small coverage as compared to, for example, the transmit power or coverage area of a macro network based station or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a wireless relay station, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

Figure 1:
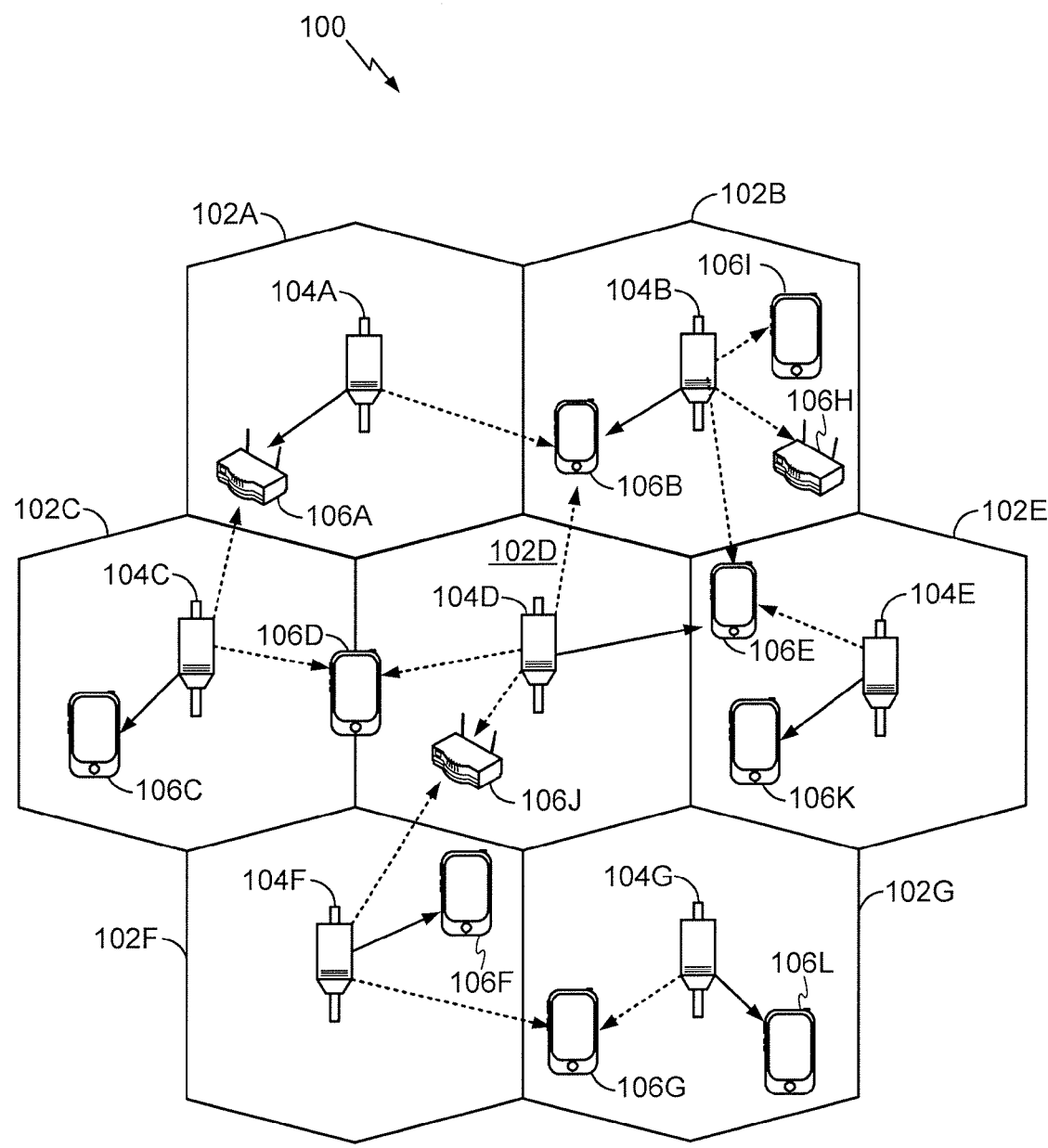
FIG. 1 is a conceptual diagram of an example of an access network in which the present aspects may be implemented.

FIG. 1 illustrates an example wireless communication network 100 demonstrating multiple access communications, and in which the present aspects may be implemented. The illustrated wireless communication network 100 is configured to support communication among a numbers of users. As shown, the wireless communication network 100 may be divided into one or more cells 102, such as the illustrated cells 102A-102G. Communication coverage in cells 102A-102G may be provided by one or more base stations 104, such as the illustrated base stations 104A-104G. In this way, each base station 104 may provide communication coverage to a corresponding cell 102. The base station 104 may interact with a plurality of user devices 106, such as the illustrated user devices 106A-106L.

Each user device 106 may communicate with one or more of the base stations 104 on a downlink (DL) and/or an uplink (UL). In general, a DL is a communication link from a base station to a user device, while an UL is a communication link from a user device to a base station. The base stations 104 may be interconnected by appropriate wired or wireless interfaces allowing them to communicate with each other and/or other network equipment. Accordingly, each user device 106 may also communicate with another user device 106 through one or more of the base stations 104. For example, the user device 106J may communicate with the user device 106H in the following manner: the user device 106J may communicate with the base station 104D, the base station 104D may then communicate with the base station 104B, and the base station 104B may then communicate with the user device 106H, allowing communication to be established between the user device 106J and the user device 106H.

The wireless communication network 100 may provide service over a large geographic region. For example, the cells 102A-102G may cover a few blocks within a neighborhood or several square miles in a rural environment. In some systems, each cell may be further divided into one or more sectors (not shown). In addition, the base stations 104 may provide the user devices 106 access within their respective coverage areas to other communications networks, such as the Internet or another cellular network. Each user device 106 may be a wireless communication device (e.g., a mobile phone, router, personal computer, server, etc.) used by a user to send and/or receive voice and/or data over a communications network, and may be alternatively referred to as an Access Terminal (AT), a Mobile Station (MS), a User Equipment (UE), etc. In the example shown in FIG. 1, user devices 106A, 106H, and 106J comprise routers, while the user devices 106B-106G, 106I, 106K, and 106L comprise mobile phones. Again, however, each of the user devices 106A-106L may comprise any suitable communication device.

For their wireless air interfaces, each base station 104 may operate according to one of several Radio Access Technologies (RATs) depending on the network in which it is deployed, and may be alternatively referred to as a NodeB, evolved NodeB (eNB), etc. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2).

In cellular networks, macro base stations (or macro cells or conventional base stations) provide connectivity and coverage to a large number of users over a certain geographical area. A macro cell network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience. Further, macro cell capacity is upper-bounded by physical and technological factors.

Thus, as discussed above, small cell base stations may be used to provide significant capacity growth, in-building coverage, and in some cases different services than macro cells operating alone, thereby facilitating a more robust user experience.

Figure 2:
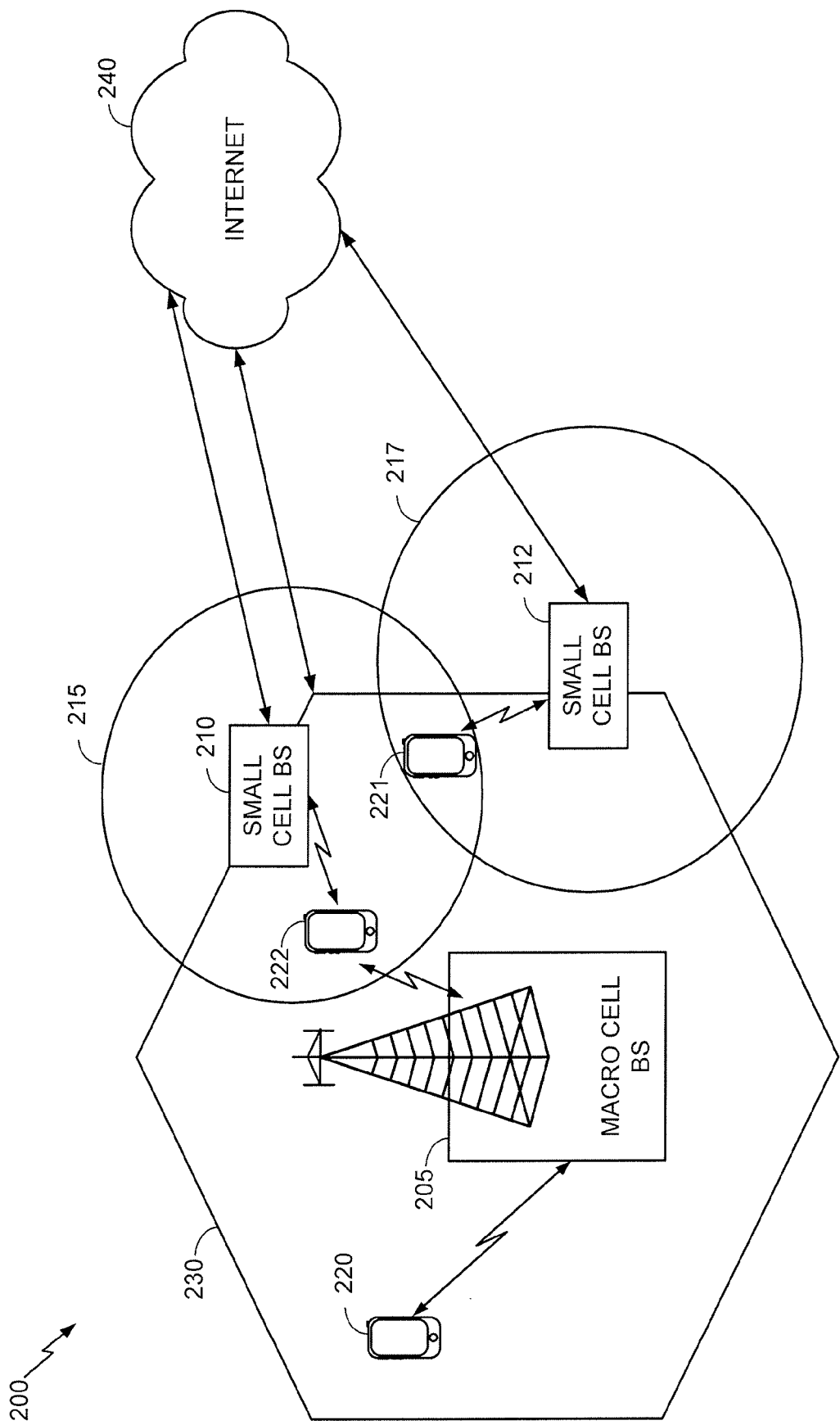
FIG. 2 is a conceptual diagram of an example communication network environment in which the present aspects may be implemented.

FIG. 2 illustrates an example mixed communication network environment 200 in which small cell base stations (or small cells) are deployed in conjunction with macro cell base stations (or macro cells), and in which the present aspects may be implemented. As discussed above, small cell base stations may be used to provide significant capacity growth, in-building coverage, and in some cases different services than macro cells operating alone, thereby facilitating a more robust user experience.

In FIG. 2, a macro cell base station 205 may provide communication coverage to one or more user devices, for example, user equipment 220, 221, and 222, within a macro cell coverage area 230 (as discussed above in more detail with reference to FIG. 1), while small cell base stations 210 and 212 may provide their own communication coverage within respective small cell coverage areas 215 and 217, with varying degrees of overlap among the different coverage areas. It is noted that certain small cells may be restricted in some manner, such as for association and/or registration, and may therefore be referred to as Closed Subscriber Group ("CSG") cells. In this example, at least some user devices, e.g., user equipment 222, may be capable of operating both in macro environments (e.g., macro areas) and in smaller scale network environments (e.g., residential, femto areas, pico areas, etc.) as shown.

Turning to the illustrated connections in more detail, user equipment 220 may generate and transmit a message via a wireless link to the macro cell base station 205, the message including information related to various types of communication (e.g., voice, data, multimedia services, etc.). User equipment 222 may similarly communicate with small cell base station 210 via a wireless link, and user equipment 221 may similarly communicate with small cell base station 212 via a wireless link. The macro cell base station 205 may also communicate with a corresponding wide area or external network 240 (e.g., the Internet), via a wired link or via a wireless link, while small cell base stations 210 and/or 212 may also similarly communicate with network 240, via their own wired or wireless links. For example, small cell base stations 210 and/or 212 may communicate with network 240 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, or some other link. This connection may utilize the existing backhaul infrastructure provided by, for example, an ISP for the residential home or office building in which small cells 210 and 212 are installed, and may accordingly be shared among other devices operating in the same environment, such as Wireless Local Area Network (WLAN) devices operating in accordance with one of the IEEE 802.11x communication protocols (so-called "Wi-Fi" devices) or other wired or wireless devices sharing the same Internet connection in a user's residence or office building.

The network 240 may comprise any type of electronically connected group of computers and/or devices, including, for example, the following networks: Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 240 includes network variations such as the public Internet, a private network within the Internet, a secure network within the Internet, a private network, a public network, a value-added network, an intranet, and the like. In certain systems, the network 240 may also comprise a Virtual Private Network (VPN).

Accordingly, it will be appreciated that macro cell base station 205 and/or either or both of small cell base stations 210 and 212 may be connected to network 240 using any of a multitude of devices or methods. These connections may be referred to as the "backbone" or the "backhaul" of the network, and may in some implementations be used to manage and coordinate communications between macro cell base station 205, small cell base station 210, and/or small cell base station 212. In this way, depending on the current location of user equipment 222, for example, user equipment 222 may access the communication network 240 by macro cell base station 205 or by small cell base station 210.

Figure 3:
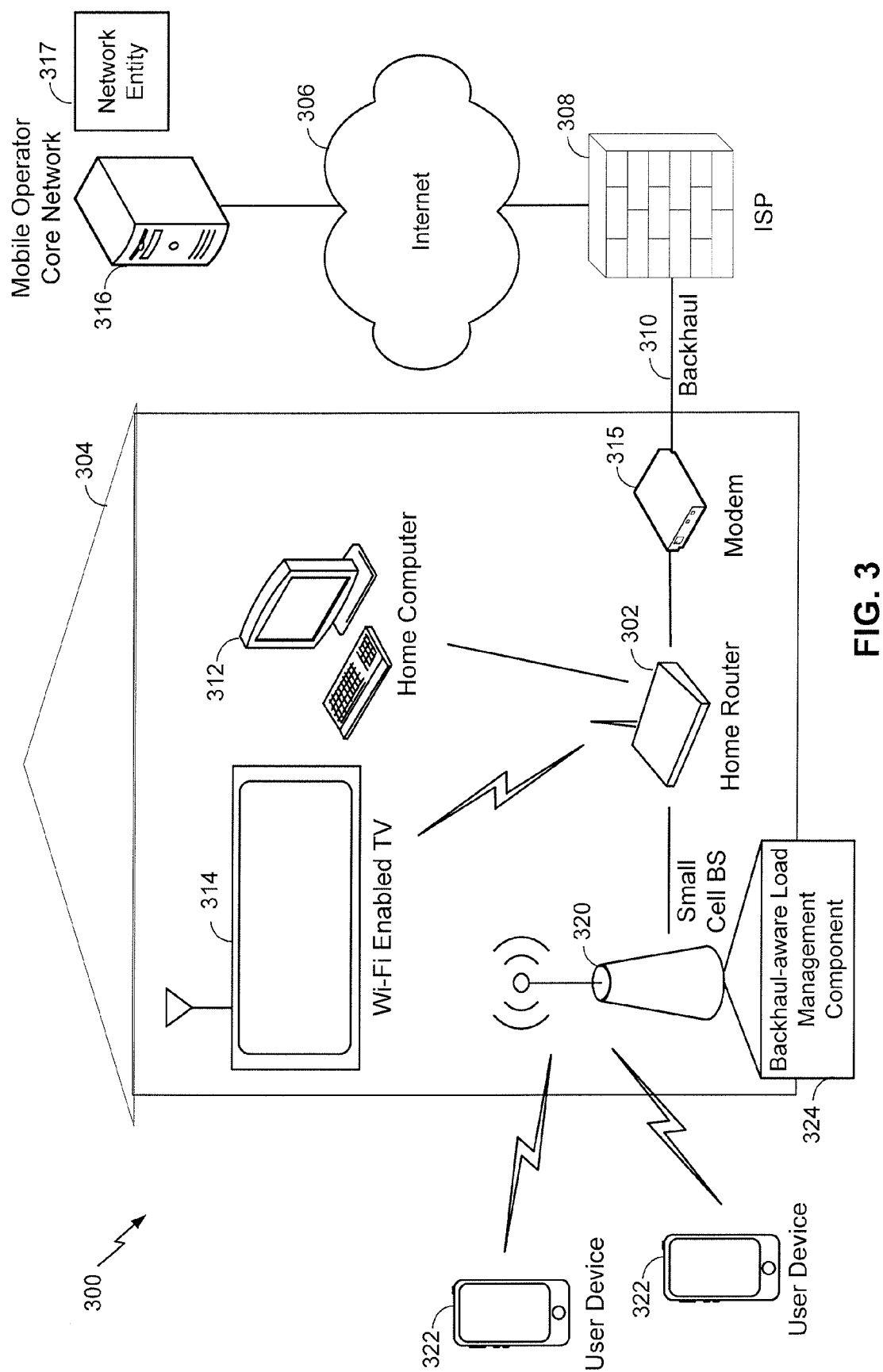
FIG. 3 is a conceptual diagram of another example of a communication network environment in which the present aspects may be implemented.

FIG. 3 illustrates an example communication system 300 in which a small cell base station shares a backhaul connection with other wired and/or wireless devices, and in which the present aspects may be implemented. For example, a home router 302 is installed in a user residence 304 and provides access to the Internet 306 via an Internet service provider (ISP) 308. The home router 302 communicates (e.g., transfers user data and other signaling information) with ISP 308 via a modem 315 over a corresponding backhaul link 310. In an aspect, for example, the home router 302 may support various wired and/or wireless devices, such as a home computer 312, a wireless fidelity (Wi-Fi) enabled TV 314, etc. In an additional aspect, the home router 302 may include a wireless access point (AP), for example, a Wi-Fi access point (AP) providing connectivity to such devices. In an additional aspect, for example, the home router 302 may be integrated with a wireless access point Wi-Fi AP for providing connectivity to such devices.

In an aspect, a small cell base station (or a small cell) 320 is installed in user residence 304 and serves one or more nearby user equipments (UE) 322 as described above. The small cell base station 320 via its connection to home router 302 and shared backhaul link 310 may provide access to Internet 306 and core network 316. Since the backhaul link 310 is shared between the traffic managed by small cell 320 (e.g., native traffic) and traffic generated by other devices that home router 302 may be serving (e.g., cross traffic), there is a potential for congestion of uplink (UL) traffic, down link (DL) traffic, and/or both, with varying degrees of impact on the performance of the small cell and/or other devices sharing the backhaul link 310.

Accordingly, improved backhaul aware load management for small cell base stations operating in an increasingly crowded communication environment is needed. In an aspect, small cell base station 320 may be configured to include a backhaul-aware load management (BALM) component 324 operable to mitigate congestion on backhaul link 310. The operation of BALM component 324 may enable small cell base station 320 to determine various backhaul characteristics, for example, sustainable throughput, and corresponding delay and jitter variations, loss, etc., to identify backhaul congestion and/or take appropriate remedial actions. For example, in an aspect, when congestion is present, operation of BALM component 324 may enable small cell base station 320 via its radio resource management (RRM) module to offload one or more UEs 322 to a macro cell base station or otherwise reduce the coverage area of small cell base station 320 in order to reduce the number of UEs 322 being served. In an additional aspect, when congestion is present, operation of BALM component 324 may enable small cell base station 320 via its RRM module to offload one or more low throughput devices to a macro cell base station and/or reduce the coverage area of small cell base station 320 by lowering a pilot channel signal strength in order to reduce the number of UEs 322 being served. In an additional or optional aspect, operation of BALM component 324 may enable small cell base station 320 to limit the data rate of certain flows that are not backhaul-limited (e.g., by changing a video encoding rate). In a further additional or optional aspect, operation of BALM component 324 may enable small cell base station 320 to alert the user of one of the UEs 322 to enable the user of the UE to choose one of the above-noted actions and control the operation of the small cell. In an additional or optional aspect, the user of the UE may be alerted via a graphical user interface (GUI) to allow the user of the UE to choose one of the above-noted actions as described above.

Figure 4:
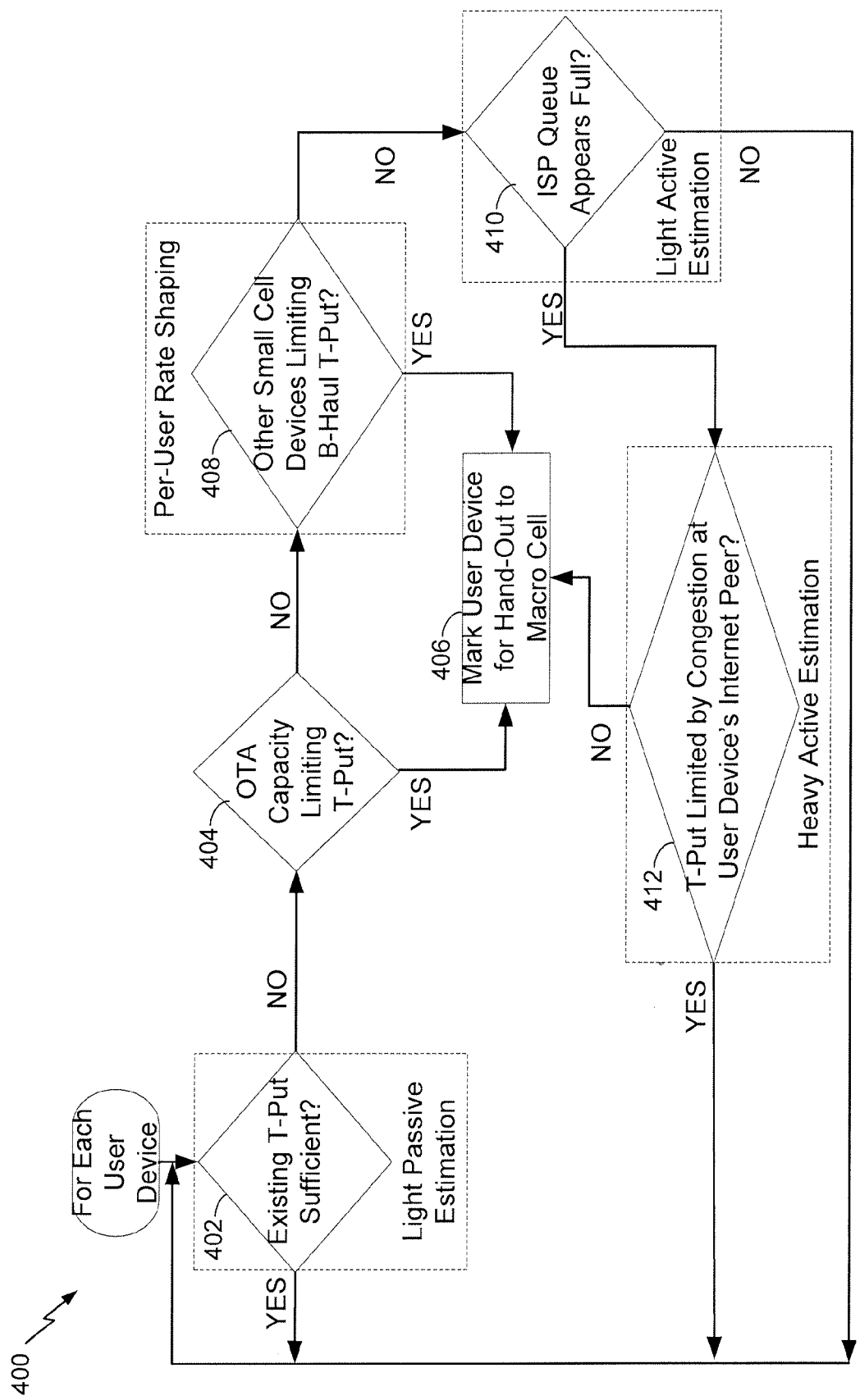
FIG. 4 is a flow diagram providing an overview of various aspects of backhaul estimation as contemplated by the present disclosure.

FIG. 4 is a flow diagram 400 providing an overview of various BALM related procedures performed by a small cell base station via operation of BALM component 324. For example, in an aspect, a small cell base station (e.g., small cell base station 320 of FIG. 3) via operation of BALM component 324 may continually or periodically monitor throughput conditions of UEs supported (e.g., camped) by the small cell base station to determine if the throughput at the UE is sufficient or otherwise acceptable (e.g., naturally low-rate traffic, Internet peer limited, etc.). If the small cell base station via operation of BALM component 324 detects that the throughput appears to be insufficient and/or unacceptable, then the small cell base station via operation of BALM component 324 may then determine whether the underlying congestion is backhaul related, air link related, located in the UE's peer, and/or simply due to a low-rate application, and may take an appropriate action. For example, in an aspect, the determination may be based on whether the backhaul has unused capacity. If the small cell base station via operation of BALM component 324 detects that the backhaul has unused capacity, the backhaul may generally have no impact on the UE experiencing a low-throughput condition.

Referring in more detail to FIG. 4, in an aspect, for each UE (e.g., each of the UEs 322 in FIG. 3), a small cell base station (e.g., small cell base station 320 in FIG. 3) via operation of BALM component 324 may perform a light passive estimation procedure to determine if the existing throughput is sufficient for the UE (decision 402). For example, the determination may be made for both for the UL, DL, and/or both, either separately or together. If the existing throughput is sufficient ('yes' at decision 402), there is no congestion problem for the UE and the small cell base station continues to perform light passive estimation monitoring as appropriate, as described above.

In an aspect, if it is determined that the existing throughput is not sufficient ('no' at decision 402), the small cell base station via operation of BALM component 324 checks whether it is over-the-air (OTA) capacity that is limiting the throughput (decision 404). If it is determined that the OTA capacity is limiting the throughput ('yes' at decision 404), the small cell base station via operation of BALM component 324 may take remedial actions to relieve the congestion on its air link, e.g., marking the UE as a candidate for handout to, e.g., a macro cell base station (block 406). In an alternate aspect, if it is determined that it is not the OTA capacity that is limiting the throughput ('no' at decision 404), the small cell base station via operation of BALM component 324 may perform a per-user rate shaping procedure and determine if other UEs being served by the small cell base station are limiting backhaul throughput (decision 408). In an additional aspect, if it is determined that other UEs being served by the small cell base station are limiting the backhaul throughput ('yes' at decision 408), the small cell base station via operation of BALM component 324 may take remedial actions, e.g., marking the user equipment as a candidate for handout to a macro cell base station (block 406).

In an aspect, if it is determined that the other UEs being served by the small cell base station are not limiting the backhaul throughput ('no' at decision 408), the small cell base station via operation of BALM component 324 may perform a light active estimation procedure (for example, estimation of backhaul state using actively-induced packets with small overhead or naturally-induced/occurring packets whose statistical characteristics make them a good replacement for actively-induced packets for light active estimation, which are typically used to directly measure backhaul latency and loss) to determine if the Internet service provider (ISP) queue is fully utilized (decision 410). If it is determined that the ISP queue does not appear to be full ('no' at decision 410), there may be no backhaul capacity problem and the small cell base station via operation of BALM component 324 may revert to performing light passive estimation monitoring as appropriate, as described above. In an alternative aspect, if it is determined that the ISP queue does appear to be full ('yes' at decision 410), there may be a backhaul capacity problem and the small cell base station via operation of BALM component 324 may further perform a heavy active estimation procedure (e.g., estimation of backhaul state using actively-induced packets with potentially high overhead, or naturally-induced/occurring packets whose statistical characteristics make them a good replacement for actively-induced packets for heavy active estimation, which are typically used to directly measure throughput) to determine if the throughput is being limited by congestion at the Internet peer with which the UE is communicating, rather than by the backhaul link itself (decision 412).

In an aspect, if it is determined that throughput is not being limited by congestion at the Internet peer with which the UE is communicating ('no' at decision 412), the small cell base station via operation of BALM component 324 may determine that there is a backhaul capacity problem and may take remedial actions, e.g., marking the UE as a candidate for handout to a macro cell base station (block 406). In an alternative aspect, if it is determined that the throughput is being limited by congestion at the Internet peer with which the UE is communicating ('no' at decision 412), there may be no backhaul capacity problem and the small cell base station via operation of BALM component 324 may revert to performing light passive estimation monitoring as appropriate, as described above.

In an aspect, in order to optimize BALM component 324 and the different BALM related procedures in FIG. 4, the small cell base station via operation of BALM component 324 may perform various calibration procedures on a continual, periodic, and/or or an event-driven basis. For example, different backhaul networks may experience congestion differently, e.g., at least in part due to the different subscription policies and schedulers used by the different ISPs to implement their respective networks. Additionally, small cell base stations are typically blind to the particular ISP implementations and pre-configurations to accommodate all potential variations would be exhaustive if not prohibitive. Accordingly, a small cell base station operating BALM component 324 configured to perform BALM related procedures as described above may be further configured to calibrate the procedures by determining, e.g., in an automated manner, various parameters related to the backhaul implementation ("backhaul parameters") in which the small cell base station is deployed.

Figure 5:
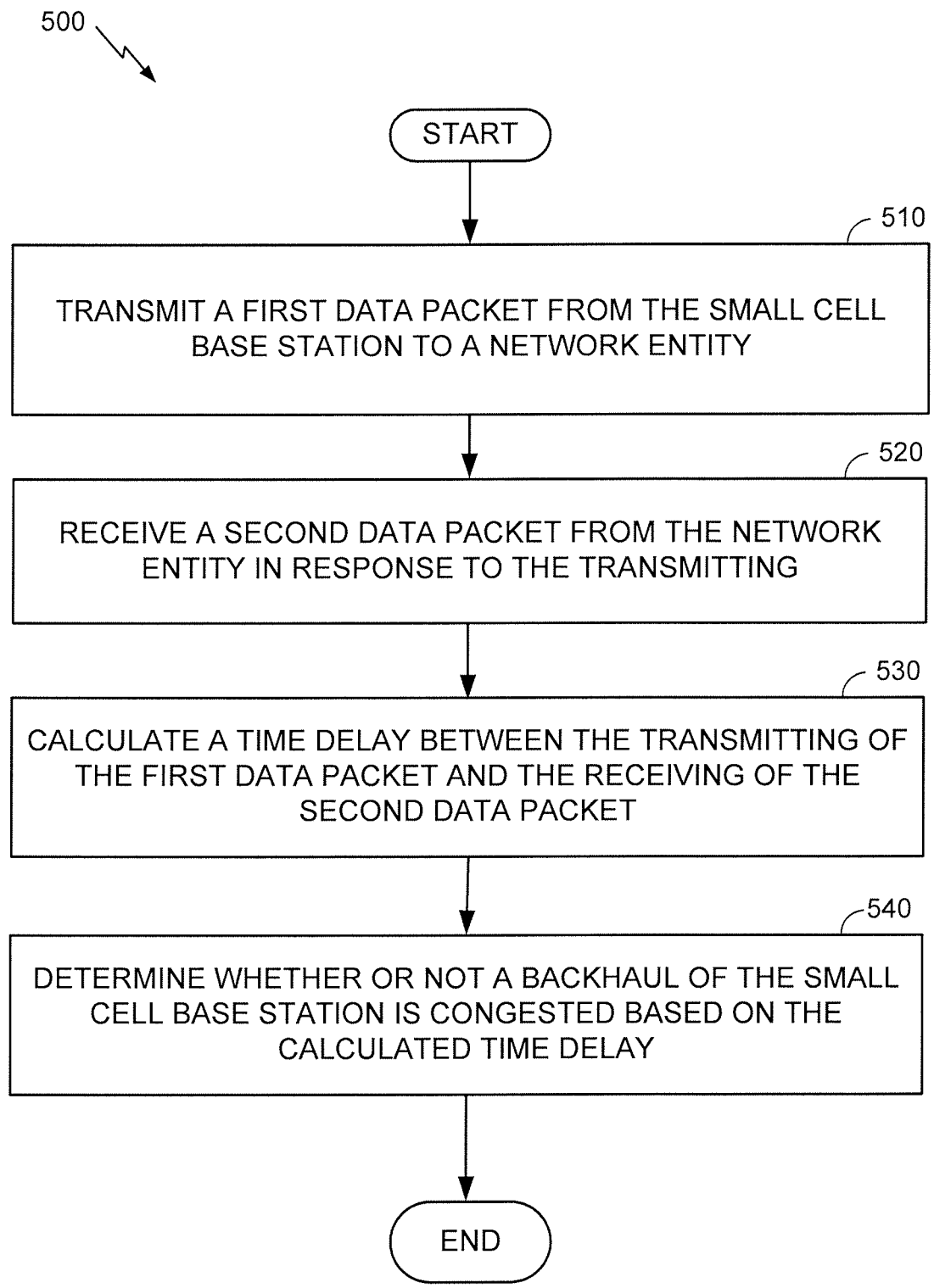
FIG. 5 is a flow diagram of an example method of light active estimation mechanism in aspects of the present disclosure.

FIG. 5 is a flow diagram 500 illustrating an example method used in an aspect of a light active estimation mechanism for backhaul management at a small cell base station.

In an aspect, at block 510, methodology 500 may include transmitting a first data packet from the small cell base station to a network entity. For example, in an aspect, small cell base station 320 and/or BALM component 324 may include a specially programmed processor module, or a processor executing specially programmed code stored in a memory, to transmit a data packet (e.g., a first data packet) from small cell base station 320 to network entity 317. In an aspect, network entity 317 may be a remote server located within mobile operator core network 316. In an additional or optional aspect, e.g., in an aspect of self sampling, network entity 317 may be small cell base station 320. In a further additional or optional aspect, e.g., in an aspect of peer sampling, network entity 317 may be incorporated into a remote small cell base station.

In an aspect, small cell base station 320 and/or BALM component 324 may transmit a packet that may be a transmission control protocol (TCP) handshake packet that may include TCP handshake signaling, e.g., a synchronize (SYN) packet. In an additional or optional aspect, the packet transmitted from small cell base station 320 may be a hypertext transfer protocol (HTTP) GET command requesting a file. In an additional aspect, small cell base station 320 and/or BALM component 324 may transmit a packet at regular or irregular intervals and/or periodically according to a sampling schedule.

For example, small cells can be deployed for incremental capacity growth, richer user experience, in-building or other specific geographic coverage, and/or the like. The small cell base stations may be connected to the Internet and/or a mobile operator's network via a digital subscriber line (DSL) router or a cable modem, for example, often utilizing the existing backhaul infrastructure provided by an Internet Service Provider (ISP) for the residential home or office building in which the small cell base station is installed.

In an aspect, at block 520, methodology 500 may include receiving a second data packet from the network entity in response to the transmitting. For example, in an aspect, small cell base station 320 and/or BALM component 324 may include a specially programmed processor module, or a processor executing specially programmed code stored in a memory, to receive a data packet (e.g., a second data packet) from network entity 317 in response to the transmitting of the data packet (e.g., the first data packet) from small cell base station 320 to network entity 317.

In an aspect, small cell base station 320 and/or BALM component 324 may receive a packet (e.g., second data packet) which may be a TCP handshake response packet that may include TCP handshake signaling, e.g., a SYN packet or a reset (RST) packet. In an additional or optional aspect, the packet received may be a HTTP response that includes the requested file.

In an aspect, at block 530, methodology 500 may include calculating a time delay between the transmitting of the first data packet and the receiving of the second data packet. For example, in an aspect, small cell base station 320 and/or BALM component 324 may include a specially programmed processor module, or a processor executing specially programmed code stored in a memory, to calculate a time delay between the transmitting of the first data packet from small cell base station 320 (e.g., to network entity 317) and the receiving of the second data packet at the small cell base station (e.g., from the network entity).

In an aspect, at block 540, methodology 500 may include determining whether or not a backhaul of the small cell base station is congested based on the calculated time delay. For example, in an aspect, small cell base station 320 and/or BALM component 324 may include a specially programmed processor module, or a processor executing specially programmed code stored in a memory, to determine whether or not a backhaul of small cell base station 320 is congested based on the calculated time delay.

For example, small cell base station 320 and/or BALM component 324 may determine whether or not the backhaul is congested based on the calculated time delay. In an aspect, determining whether or not the backhaul is congested may include determining whether or not a first distance metric (e.g., $d(x, y_{empty})$) between the calculated time delay and a first sample time delay (e.g., $y_{empty}$) determined from a calibration procedure is greater than a multiple (e.g., γ) of a second distance metric (e.g., $d(x, yf_{ull})$) between the calculated time delay and a second sample time delay (e.g., $y_{full}$) determined from the calibration procedure.

In an optional aspect, if small cell base station 320 and/or BALM component 324 determines that the backhaul is congested, small cell base station 320 and/or BALM component 324 may trigger a heavy active estimation procedure performed at 412 of FIG. 4. That is, determining that there is congestion at 540 corresponds to the "yes" branch of 410 of FIG. 4. Once triggered, small cell base station 320 and/or BALM component 324 may use the heavy active estimation procedure to determine whether or not to handoff one or more UEs of small cell base station 320. In an additional optional aspect, small cell base station 320 and/or BALM component 324 may immediately hand off at least one UE served by small cell base station 320 to a macro cell base station when the light active estimation procedure determines that backhaul 310 is congested, rather than, or in addition to, triggering the heavy active estimation procedure.

In an optional aspect, if small cell base station 320 and/or BALM component 324 determines that the backhaul is not congested, methodology 500 returns to block 510 and methodology 500 begins again.

Figure 6:
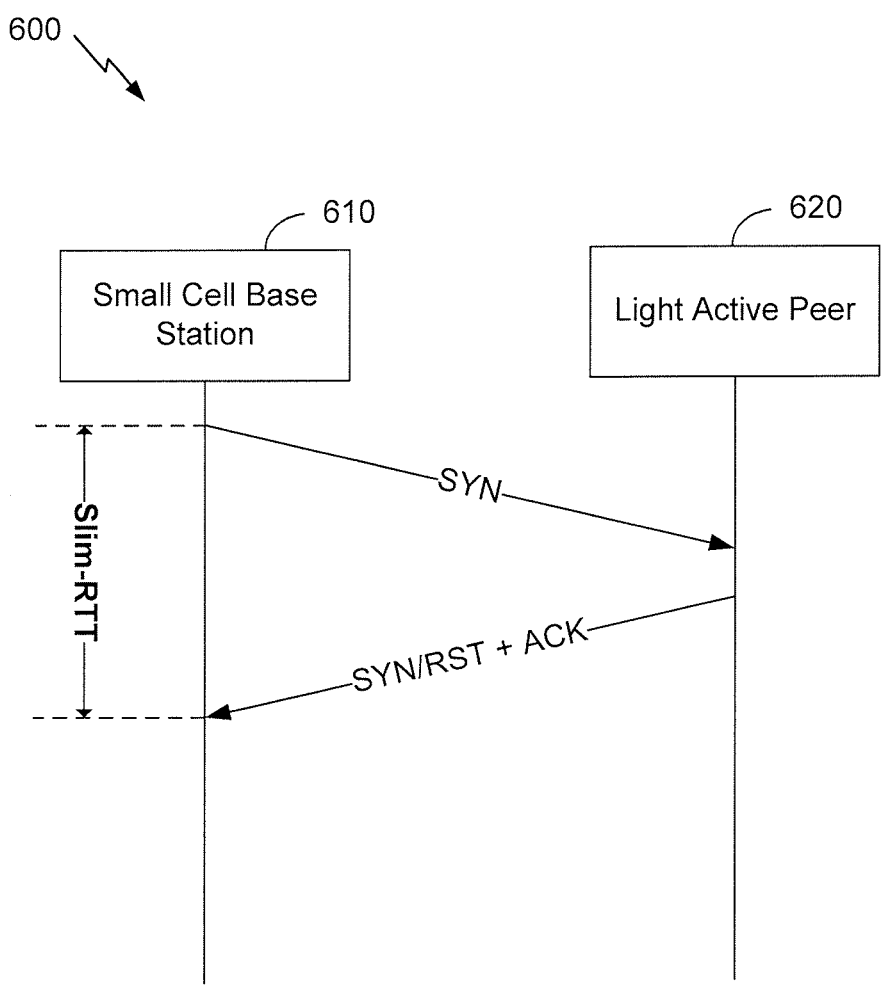
FIG. 6 is a example flow diagram of calculating slim-round trip time (RTT) in aspects of the present disclosure.

FIG. 6 is an example flow diagram for calculating round trip time (RTT), e.g., slim-RTT, in aspects of the present disclosure. For example, slim-RTT is a measure of TCP handshake RTT, and may work better when there is no listening server functionality. For example, in an aspect, small cell base station 610 (e.g., similar to small cell base station 320) and/or BALM component 324 may send a TCP SYN message (or packet) to a light active peer 620 for light active estimation mechanism. For example, in an aspect, light active peer 620 may be a server (e.g., a server in mobile operator core network 316 in FIG. 3 or network entity 317), any other server connected over the Internet 306 in FIG. 3, another small cell base station (e.g., in aspects of peer sampling, discussed above in reference to FIG. 5), or small cell base station 610 itself (e.g., in aspects of self-sampling, discussed above in reference to FIG. 5).

In an aspect, light active peer 620 may respond to small cell base station 610 with an acknowledgement message (e.g., TCP ACK) which may also include a TCP SYN/RST message. For example, in an aspect, sample time delay using slim-RTT is the elapsed time from the time the small cell base station 610 sends the SYN message to the time small cell base station 610 receives the ACK message containing SYN/RST message.

Figure 7:
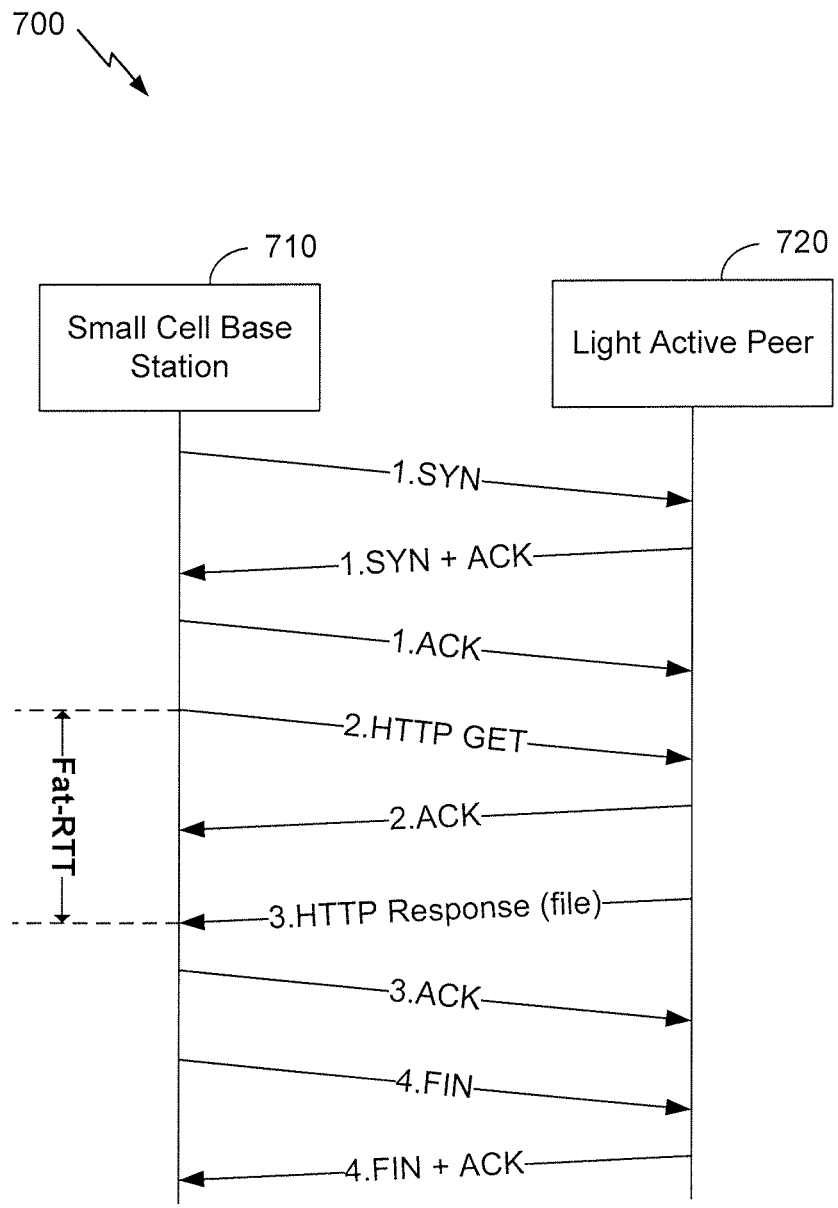
FIG. 7 is an example flow diagram of calculating fat-round trip time (RTT) in aspects of the present disclosure.

FIG. 7 is an example flow diagram of calculating round trip time (RTT), e.g., fat-RTT, in aspects of the present disclosure. For example, fat-RTT is a measure of hypertext transfer protocol (HTTP) response time. In an aspect, HTTP response size (e.g., size of the response, second data packet) is generally less than or equal to the maximum segment size (e.g., MSS parameter of TCP protocol, or maximum transmission unit (MTU) of the route between the small cell and its peer) that specifies the largest amount of data, specified in octets, that a device (e.g., small cell base station 320) may receive via a single TCP segment or packet.

In an aspect, fat-RTT may be used when slim-RTT statistics are not indicative of congestion, for example, when ISP 308 in FIG. 3 prioritizes requests based on packet size. In an aspect of a slim-RTT sampling procedure or the initial TCP handshake of a fat-RTT sampling procedure, small cell base station 710 (e.g., similar to small cell base station 320) and/or BALM component 324 may send a TCP SYN message to light active peer 720. Light active peer 720 may respond to small cell base station 710 with a TCP SYN message including an ACK. The small cell base station 710 can then send an ACK to the light active peer.

In an additional aspect of a fat-RTT sampling procedure, small cell base station 710 may send a HTTP GET message to light active peer 720 requesting some file. The light active peer 720 responds with an ACK and transmits a HTTP response (e.g. the requested file). Upon receiving the file, small cell base station 710 sends an ACK to the light active peer 720, followed by a TCP FIN message. The light active peer 720 then sends a TCP FIN message and an ACK, and the communication session ends. As shown in FIG. 7, a sample time delay using fat-RTT is the elapsed time from the time small cell base station 710 sends the HTTP GET command to the time the small cell base station 710 finishes receiving the HTTP response.

In an aspect, various functions may be used to determine which packets should be sampled for the light active estimation procedure. For example, a function of light active estimation samples may be a cumulative distribution function (CDF) with a tail of some percentage x %, e.g., 90% or 50%. In an additional or optional aspect, the x % tail may be determined at calibration time. For example, the percentage could be determined based on a function, e.g., argminx of var (Full_Queue-x %–Empty_Queue-x %), where the "Queue" is the ISP queue. Another example function of light active estimation samples is a vector of predetermined CDF points. However, this is simply a generalization of the cumulative distribution function tail.

In an aspect, the light active estimation procedure may sample TCP packets and determine the corresponding sample time delay at various rates. The sampling rate may vary depending on the expected presence of cross traffic, which may be based on the time of day and possibly calibrated, and/or the number of observed clients connected to the small cell base station 320 in FIG. 3 and the number of observed TCP flows.

In an aspect, the sample time delay collecting process may be induced or natural. For example, the collecting process may be induced by sending the TCP probes described above. The induced sample time delays may be generated from fat-RTT, slim-RTT, and/or time stamping, as described above. Moreover, none of these may require initiation and termination of TCP flows for each sample, but rather, may be achieved within the confines of a single TCP flow. For example, a file transfer protocol (ftp) client may pretend to upload a file, and while releasing TCP packets one at a time, can observe the RTT from the time of the ACK to the release packets. If such a probing packet or the response packet is lost/dropped, then the packet loss statistics may be used as for RTT. For example, if a TCP SYN message or a response to a TCP SYN message is lost, then the corresponding entry for the RTT would be assigned a known high value.

In an aspect, the collecting process can be "natural" by observing naturally occurring time differences of packets received from specific light active peers/servers. For example, the time differences may be determined from TCP handshakes, from servers implementing TCP time stamping, etc. The specific servers may be specified in the system configuration, or determined from observations of minimal congestion occurrence, which may be correlated with the induced samples.

In an aspect, small cell base station 320 in FIG. 3 may also perform self-sampling. For example, small cell base station 320 may send a packet to itself by placing its own Internet protocol (IP) address in the destination field of a TCP packet. This can be done with a loose or strict IP routing option, or by bypassing the "is packet local" check in the client routing code. Without the loose or strict routing, this is especially useful if packets are tunneled through the home router 302 in FIG. 3 towards a tunnel endpoint at or beyond the ISP gateway (DSLAM, CMTS). The small cell base station 320 may also use a different sending IP address than its own to help with packet matching.

In an aspect, to avoid interfering with other communications during self-sampling, the small cell base station 320 may reserve a port. The small cell base station 320 may reserve a port by opening a listening socket and reusing the port to which the socket listens, by opening a connection and reusing the local port for the connection, by configuring the network or changing the network so that no application accidentally listens on some port, or by being aware of which ports are in use and avoiding those ports.

In an additional or optional aspect, small cell base station 320 may perform peer-sampling. For example, small cell base station 320 may incorporate a sampling server. The sampling server can assist the light active estimation procedure of other small cell base stations and may report back the downlink time difference observations (e.g., of client uplink probes from clients of other small cell base stations) or be prompted to initiate uplink (e.g., downlink from the perspective of the other small cell base station 320's clients) probes.

In a further additional aspect, small cell base station 320 may also initiate light active estimation packet sampling with multiple servers (or peers), and take a vote between them. For example, small cell base station 320 may determine that there is congestion if it observes congestion with respect to all the servers/peers.

In an aspect, for example, based on the time delay estimate determined from the sampled packets, the light active estimation procedure can determine the congestion of the backhaul 310 in FIG. 3. For example, if "x" is the time delay estimate obtained from the light active estimation procedure sampling one or more TCP packets, $y_{full}$ and $y_{empty}$ are sample time delays obtained from the light active estimation calibration procedure. Further, there is conges-tion in a particular direction when the $Distance_{empty}$ is greater than $\gamma Distance_{full}$, where $\gamma$ is a predefined, configured, or calibrated metric.

In an aspect, a Distance A (e.g., $Distance_{empty}$ or $Distance_{full}$) is a distance metric between x and $y_A$ (e.g., $y_{empty}$ or $y_{full}$), represented as $d(x, y_A)$. As an example, $d(x, y_A)$ may be an L-metric between vectors x and $y_A$, represented as $|W(x-y_A)|L$, where W is a weight matrix (e.g., non-zero diagonal of weights). When L is 1, this equation is the (sum of) the absolute value(s) of x and $y_A$. When L is 2, this equation is the Euclidean distance between x and $y_A$. As another example, $d(x, y_A)$ may be the Kolmogorov-Smirnoff distance between x and $y_A$, represented as $KS(x, y_A)$. As yet another example, $d(x, y_A)$ may be the Kullback-Leibler divergence between x and $y_A$, represented as $KL(x, y_A)$.

In an aspect, to determine which direction (i.e., uplink or downlink) is experiencing congestion, the uplink, downlink, and uplink plus downlink distances may be compared. This may be, but need not be, the same Distance metric as used above when determining congestion. In practice, the uplink congestion can be isolated from the downlink congestion based on the time delay, as the time delay in the presence of uplink congestion is typically much longer than the time delay in the presence of downlink congestion.

In some situations, small cell base station 320 may limit the data rate for certain clients because, for example, they are using excessive bandwidth. Small cell base station 320 may employ rate-limitation in either the uplink or the downlink direction, on top of any rate limitation that may occur upstream of the small cell base station 320's downlink or downstream of the small cell base station 320's uplink. Before probing the outer scheduler, the small cell base station 320 can check the utilization of the internal rate limiting component. If there is a limitation occurring at the internal rate-limiter, there is no need to probe to outer scheduler. That is, if the small cell base station 320 is limiting the rate for certain clients, there is no need to perform the light active estimation procedure.

Figure 8:
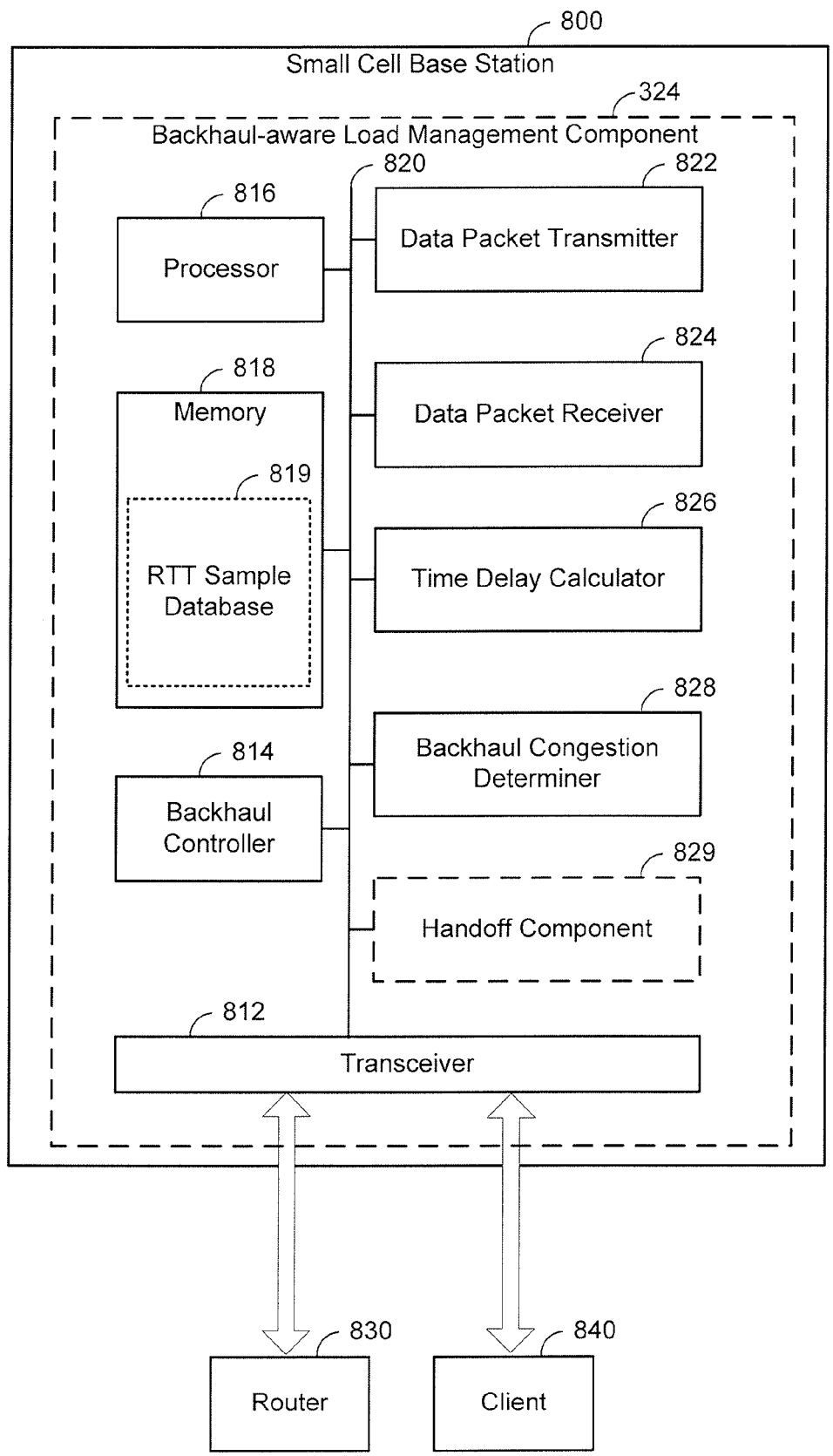
FIG. 8 is a flow diagram of an example of a method for calibrating a small cell for management of a backhaul in aspects of the present disclosure.

FIG. 8 illustrates an aspect of the configuration of BALM component 324 in an example small cell base station 800 for backhaul aware load management calibration. In this example, small cell base station 800 is deployed in the vicinity of one or more client devices 840, such as the UEs 322 in FIG. 3, and a router 830 providing Internet access, such as the home router 302 in FIG. 3. It should be noted that BALM component 324 may include all or some portion of the following, or may include a separate portion of some of these components that are in communication with remaining ones of these components.

In general, the small cell base station 800 and/or BALM component 324 includes various components for providing and processing services for the client devices 840. For example, the small cell base station 800 may include a transceiver 812 for wireless communication with the one or more of the clients 840 and a backhaul controller 814 for backhaul communications with other network devices, such as the router 830. These components may operate under the direction of a processor 816 in conjunction with memory 818, for example, all of which may be interconnected via a bus 820 or the like.

In addition and in accordance with the discussion above, the small cell base station 800 (similar to small cell base station 320) and/or BALM component 324 may also further include a data packet transmitter 822 for transmitting data packets from a small cell base station to a network entity, a data packet receiver 824 for receiving data packets from the network entity in response to the transmission, a time delay calculator 826 for calculating a time delay between the transmitting of the first data packet and the receiving of the second data packet, and a backhaul congestion determiner 828 for determining whether or not a backhaul of the small cell base station is congested based on the calculated time delay For example, in an aspect, backhaul congestion determiner 828 may be configured to determine whether or not a first distance metric between the calculated time delay and a first sample time delay is greater than a multiple of a second distance metric between the calculated time delay and a second sample time delay. In an additional aspect, the first and the second sample time delays are determined from a calibration procedure.

In an additional aspect, backhaul congestion determiner 828 may be configured to determine whether or not a first distance metric between the calculated time delay and a first sample time delay is greater than a multiple of a second distance metric between the calculated time delay and a second sample time delay, wherein the first sample time delay includes a sample time delay when an internet service provider (ISP) queue is empty and the second sample time delay includes a sample time delay when the ISP queue is full.

In an optional aspect, small cell base station 800 and/or BALM component 324 may further include a handoff component 829 for handing off a user equipment (UE) served by the small cell base station to a macro cell base station when the backhaul is congested. It will be appreciated that in some designs one or more or all of these operations may be performed by or in conjunction with the processor 816 and memory 818.

Figure 9:
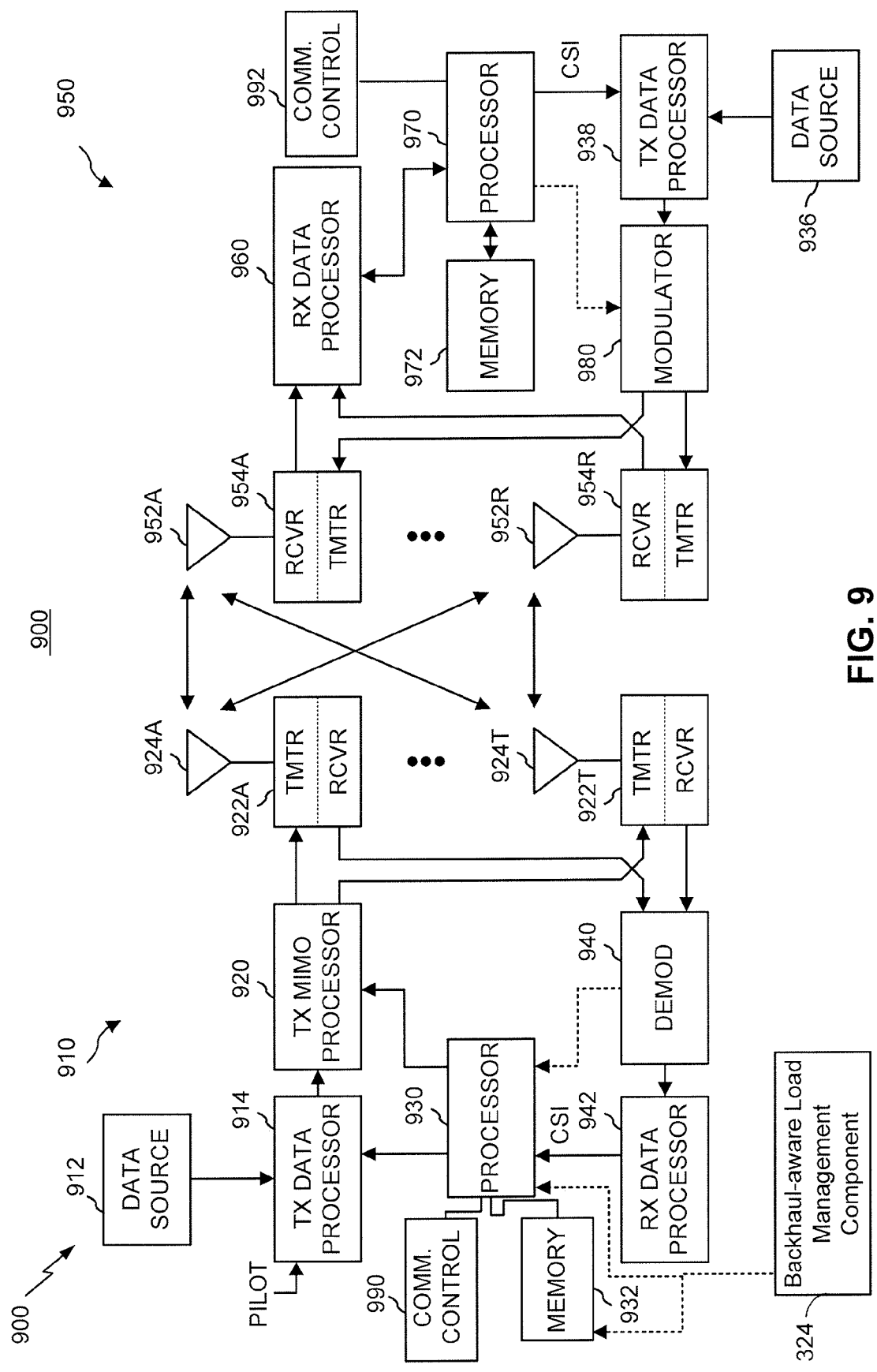
FIG. 9 is a block diagram of an example of a NodeB in communication with a UE in a telecommunications system in which the present aspects may be implemented.

FIG. 9 illustrates in more detail the principles of wireless communication between a wireless device 910 (e.g., small cell base station 320 of FIG. 3), including BALM component 324, and a wireless device 950 (e.g., UE 322 of FIG. 3) of a sample communication system 900 that may be adapted as described herein. In an aspect, the functionality of BALM component 324 may be in one or more modules or instructions within processor 930, or within computer readable instructions stored in memory 932 and executable by processor 930, or some combination of both.

At the device 910, traffic data for a number of data streams is provided from a data source 912 to a transmit (TX) data processor 914. Each data stream may then be transmitted over a respective transmit antenna.

The TX data processor 914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides NT modulation symbol streams to NT transceivers (XCVR) 922A through 922T. In some aspects, the TX MIMO processor 920 applies beamforming weights to the symbols of the data streams and to the antenna from which the symbol is being transmitted.

Each transceiver 922 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 922A through 922T are then transmitted from NT antennas 924A through 924T, respectively.

At the device 950, the transmitted modulated signals are received by NR antennas 952A through 952R and the received signal from each antenna 952 is provided to a respective transceiver (XCVR) 954A through 954R. Each transceiver 954 conditions (e.g., filters, amplifies, and down converts) a respective received signal, digitizes the conditioned signal to provide samples, and further processes the samples to provide a corresponding "received" symbol stream.

A receive (RX) data processor 960 then receives and processes the NR received symbol streams from NR transceivers 954 based on a particular receiver processing technique to provide NT "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator (DEMOD) 940, and processed by a RX data processor 942 to extract the reverse link message transmitted by the device 950. The processor 930 then determines which pre-coding matrix to use for determining the beam-forming weights then processes the extracted message.

FIG. 9 also illustrates that the communication components may include one or more components that perform calibration for management of a backhaul link to an ISP as taught herein. For example, a communication (COMM.) component 990 may cooperate with the processor 930 and/or other components of the device 910 to perform the calibration as taught herein. Similarly, a communication control component 992 may cooperate with the processor 970 and/or other components of the device 950 to support the configuration as taught herein. It should be appreciated that for each device 910 and 950 the functionality of two or more of the described components may be provided by a single component. For example, a single processing component may provide the functionality of the communication control component 990 and the processor 930 and a single processing component may provide the functionality of the communication control component 992 and the processor 970.

Figure 10:
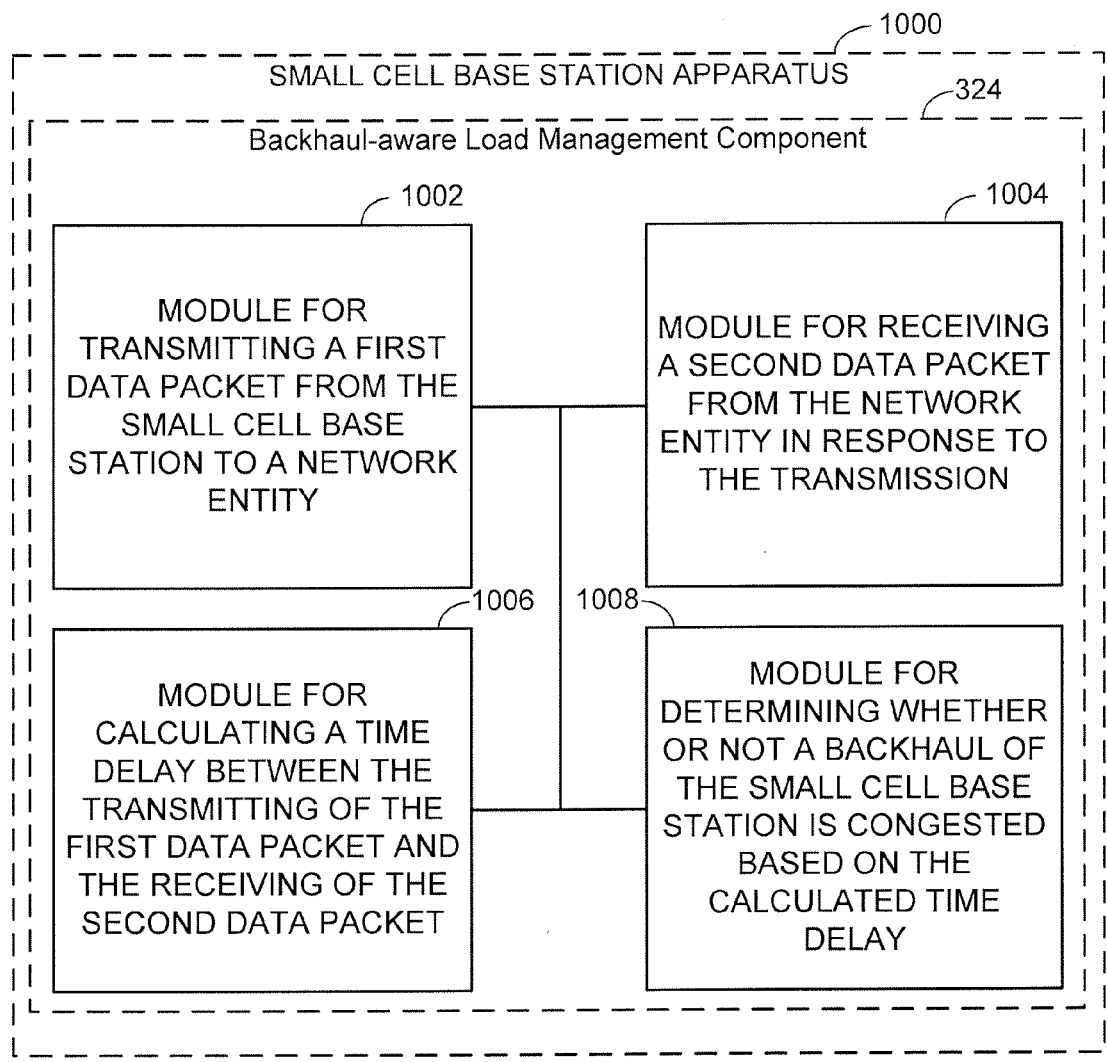
FIG. 10 is a block diagram of an example of a small cell apparatus, represented as a series of interrelated functional modules, according to a present aspect.

FIG. 10 illustrates an example small cell apparatus 1000, including BALM component 324, represented as a series of interrelated functional modules. In an aspect, small cell apparatus 1000 (same as small cell base station 320) and/or BALM component 324 may include a module for transmitting 1002 that may correspond at least in some aspects to, for example, a data packet transmitter 822 as discussed herein, a module for receiving 1004 that may correspond at least in some aspects to, for example, a data packet receiver 824 as discussed herein, a module for calculating 1006 1004 that may correspond at least in some aspects to, for example, a time delay calculator 826 as discussed herein, and a module for determining 1008 that may correspond at least in some aspects to, for example, a backhaul congestion determiner 828, as discussed herein, The functionality of the modules of FIG. 10 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 10 as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect disclosed can include a computer readable media embodying a method for calibrating a small cell base station for management of a backhaul link to an ISP. Accordingly, the invention is not limited to illustrated examples and any means for performing the functionality described herein are included in aspects disclosed.

While the foregoing disclosure shows illustrative aspects disclosed, it should be noted that various changes and modifications could be made herein without departing from the scope of the invention as defined by the appended claims. The functions, steps and/or actions of the method claims in accordance with the aspects described herein need not be performed in any particular order. Furthermore, although elements disclosed may be described or claimed in the singular, the plural is contemplated unless limitation to the singular is explicitly stated.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of light active estimation mechanism for backhaul management at a small cell base station, comprising:
   transmitting a first data packet from the small cell base station to a network entity;
   receiving a second data packet from the network entity in response to the transmission;
   calculating a time delay between the transmitting of the first data packet and the receiving of the second data packet; and
   determining whether a backhaul of the small cell base station is congested based on the calculated time delay, wherein determining whether the backhaul is congested includes determining whether a first distance metric between the calculated time delay and a first sample time delay is greater than a multiple of a second distance metric between the calculated time delay and a second sample time delay.

2. The method of claim 1, further comprising:
   handing off a user equipment (UE) served by the small cell base station to a macro cell base station when the backhaul is congested.

3. The method of claim 1, further comprising:
   triggering a heavy active estimation procedure that determines whether throughput is limited by congestion at the network entity.

4. The method of claim 1, wherein the first data packet that is transmitted includes a transmission control protocol (TCP) handshake packet or a hypertext transfer protocol (HTTP) command requesting a file from a light active peer entity.

5. The method of claim 1, wherein the transmitting includes periodically transmitting the first data packet at regular or irregular intervals.

6. The method of claim 1, wherein the first and the second sample time delays are determined from a calibration procedure.

7. The method of claim 6, wherein the first sample time delay includes a sample time delay when an internet service provider (ISP) queue is empty and the second sample time delay includes a sample time delay when the ISP queue is full.

8. The method of claim 6, wherein the multiple of the second distance metric includes a predefined or a calibrated metric.

9. An apparatus for a light active estimation mechanism for backhaul management at a small cell base station, comprising:
   means for transmitting a first data packet from the small cell base station to a network entity;
   means for receiving a second data packet from the network entity in response to the transmission;
   means for calculating a time delay between the transmitting of the first data packet and the receiving of the second data packet; and
   means for determining whether a backhaul of the small cell base station is congested based on the calculated time delay, wherein determining whether the backhaul is congested includes determining whether a first distance metric between the calculated time delay and a first sample time delay is greater than a multiple of a second distance metric between the calculated time delay and a second sample time delay.

10. The apparatus of claim 9, further comprising:
means for handing off a user equipment (UE) served by the small cell base station to a macro cell base station when the backhaul is congested.

11. The apparatus of claim 9, further comprising:
means for triggering a heavy active estimation procedure that determines whether throughput is limited by congestion at the network entity.

12. The apparatus of claim 9, wherein the first data packet that is transmitted includes a transmission control protocol (TCP) handshake packet or a hypertext transfer protocol (HTTP) command requesting a file from a light active peer entity.

13. The apparatus of claim 9, wherein means for the transmitting includes means for periodically transmitting the first data packet at regular or irregular intervals.

14. The apparatus of claim 9, wherein the first and the second sample time delays are determined from a calibration procedure.

15. The apparatus of claim 14, wherein the first sample time delay includes a sample time delay when an internet service provider (ISP) queue is empty and the second sample time delay includes a sample time delay when the ISP queue is full.

16. The apparatus of claim 14, wherein the multiple of the second distance metric includes a predefined or a calibrated metric.

17. A non-transitory computer readable medium storing computer executable code for estimation mechanism for backhaul management at a small cell base station, comprising code to:
transmit a first data packet from the small cell base station to a network entity;
receive a second data packet from the network entity in response to the transmission;
calculate a time delay between the transmitting of the first data packet and the receiving of the second data packet; and
determine whether a backhaul of the small cell base station is congested based on the calculated time delay, wherein the code to determine whether the backhaul is congested includes determining whether a first distance metric between the calculated time delay and a first sample time delay is greater than a multiple of a second distance metric between the calculated time delay and a second sample time delay.

18. The computer readable medium of claim 17, further comprising:
code to hand off a user equipment (UE) served by the small cell base station to a macro cell base station when the backhaul is congested.

19. The computer readable medium of claim 17, further comprising:
code to trigger a heavy active estimation procedure that determines whether throughput is limited by congestion at the network entity.

20. The computer readable medium of claim 17, wherein the first data packet that is transmitted includes a transmission control protocol (TCP) handshake packet or a hypertext transfer protocol (HTTP) command requesting a file from a light active peer entity.

21. The computer readable medium of claim 17, wherein the transmitting includes periodically transmitting the first data packet at regular or irregular intervals.

22. The computer readable medium of claim 17, wherein the first and the second sample time delays are determined from a calibration procedure.

23. The computer readable medium of claim 22, wherein the first sample time delay includes a sample time delay when an internet service provider (ISP) queue is empty and the second sample time delay includes a sample time delay when the ISP queue is full.

24. The computer readable medium of claim 22, wherein the multiple of the second distance metric includes a predefined or a calibrated metric.

25. An apparatus for a light active estimation mechanism for backhaul management at a small cell base station, comprising:
a data packet transmitter to transmit a first data packet from the small cell base station to a network entity;
a data packet receiver to receive a second data packet from the network entity in response to the transmission;
a time delay calculator to calculate a time delay between the transmitting of the first data packet and the receiving of the second data packet; and
a backhaul congestion determiner to determine whether a backhaul of the small cell base station is congested based on the calculated time delay, wherein the backhaul congestion determiner is further configured to determine whether the backhaul is congested includes determining whether a first distance metric between the calculated time delay and a first sample time delay is greater than a multiple of a second distance metric between the calculated time delay and a second sample time delay.

26. The apparatus of claim 25, further comprising:
handing off a user equipment (UE) served by the small cell base station to a macro cell base station when the backhaul is congested.

27. The apparatus of claim 25, further comprising:
triggering a heavy active estimation procedure that determines whether throughput is limited by congestion at the network entity.

28. The apparatus of claim 25, wherein the first data packet that is transmitted includes a transmission control protocol (TCP) handshake packet or a hypertext transfer protocol (HTTP) command requesting a file from a light active peer entity.

29. The apparatus of claim 25, wherein the transmitting includes periodically transmitting the first data packet at regular or irregular intervals.

30. The apparatus of claim 25, wherein the first and the second sample time delays are determined from a calibration procedure.

* * * * *